United States Patent
Bosler et al.

(10) Patent No.: US 6,823,794 B2
(45) Date of Patent: Nov. 30, 2004

(54) SYSTEM AND METHOD FOR PRINTING AN EXTRUDED SHEET

(75) Inventors: Kenneth Bosler, Holland, PA (US); Robert Bosler, Langhorne, PA (US); Ralph Bosler, Holland, PA (US)

(73) Assignee: Bosler Designs, Inc., Warminster, PA (US)

( * ) Notice: Subject to any disclaimer, the term of this patent is extended or adjusted under 35 U.S.C. 154(b) by 412 days.

(21) Appl. No.: 09/888,692

(22) Filed: Jun. 25, 2001

(65) Prior Publication Data

US 2003/0031795 A1 Feb. 13, 2003

(51) Int. Cl.[7] .................................................. B41L 35/14
(52) U.S. Cl. .................................... 101/488; 101/232
(58) Field of Search ............................ 101/154, 155, 101/157, 167, 169, 232, 247, 487, 488

(56) References Cited

U.S. PATENT DOCUMENTS

| | | | | |
|---|---|---|---|---|
| 3,576,367 A | | 4/1971 | Sable | |
| 3,905,533 A | * | 9/1975 | Corse | 226/44 |
| 4,023,894 A | | 5/1977 | Goel | 101/16.13 |
| 5,203,941 A | * | 4/1993 | Spain et al. | 156/209 |
| 5,437,227 A | | 8/1995 | Straubinger | 101/169 |
| 5,606,914 A | | 3/1997 | Borgardt | 101/488 |
| 5,656,083 A | * | 8/1997 | Schonberger | 118/107 |
| 5,662,977 A | * | 9/1997 | Spain et al. | 428/42.1 |
| 6,161,930 A | | 12/2000 | Asano | 347/102 |
| 6,371,019 B1 | * | 4/2002 | Bosen et al. | 101/216 |

* cited by examiner

*Primary Examiner*—Ren Yan
(74) *Attorney, Agent, or Firm*—Mathews, Collins, Shepherd & McKay, P.A.

(57) ABSTRACT

The present invention relates to a system and method for printing an extruded sheet in which ink is applied over the extruded sheet. The extruded sheet is at an elevated temperature. The ink cures immediately upon contact with the extruded sheet having an elevated temperature. In one embodiment, at least one print roller applies a background color to the sheet and a plurality of print rollers apply one or more additional colors for forming a pattern or image on the sheet. For example, the pattern or image can have a wood grain appearance. The extruded sheet can be sized for use as a vinyl siding product.

39 Claims, 9 Drawing Sheets

SYSTEM AND METHOD FOR PRINTING AN EXTRUDED SHEET

BACKGROUND OF THE INVENTION

1. Field of the Invention

The present invention relates to a system and method for printing an extruded sheet in which ink is directly applied to the extruded sheet with one or more print rollers.

2. Description of the Related Art

It is often desirable to enhance the appearance of plastic articles, such as vinyl siding. U.S. Pat. No. 5,662,977 describes a process for manufacturing plastic siding panels with an embossed three dimensional pattern. The embossed pattern can resemble a natural wood grain. In the process, a decorative wood grain foil is transferred to an extruded plastic sheet. The wood grain foil is formed of multiple synthetic resinous paint coats printed or cast on a temporary carrier sheet. A three dimensional wood grain texture is embossed on the surface of the laminate. Following the embossing, the foil is stripped away and the wood grain resin is transferred to the extruded plastic sheet. This patent has the drawback of using high temperatures and pressures in order for proper embossing.

Other techniques have incorporated an accent color pattern within the article. U.S. Pat. No. 5,232,751 describes a method for making a vinyl sheet article including color patterns. A colorant is mixed with a top coat compound. The compound is heated and processed so that the melted colorant spreads axially in the direction of extrusion. The color-striated compound is fused with the substrate compound.

U.S. Pat. No. 5,869,176 describes a method for extruding plastic articles having an accent color pattern. Pellets of a capstock base material such as polyvinyl chloride (PVC) are combined with accent color pellets. The accent color pellets are alloyed masses of a resin and pigment which are larger than the powder particles of the base material. During extrusion, the accent color pellets soften and disperse later than the base material to produce accent color streaks simulating wood-grain. The above described color accent techniques have the shortcoming of being difficult to control the incorporated color pattern.

It is desirable to provide a system and method for printing color or a pattern of colors on an extruded sheet which can be precisely controlled.

SUMMARY OF THE INVENTION

The present invention relates to a system and method for printing an extruded sheet in which heat curable ink is applied over the extruded sheet. The extruded sheet is at an elevated temperature. The ink cures immediately upon contact with the extruded sheet having an elevated temperature. The extruded sheet can be received against a rotating drum. The drum can include a plurality of perforations to enable a vacuum to be applied to the drum for holding the extruded sheet against the drum. Alternatively, the extruded sheet is received on a rotating belt. The rotating belt can include a plurality of perforations to enable a vacuum to be applied to the belt for holding the extruded sheet against the belt. At least one print roller is positioned adjacent the drum to apply ink on the extruded sheet. In one embodiment, at least one print roller applies a background color to the sheet and a plurality of print rollers apply one or more additional colors for forming a pattern or image on the sheet in registration with one another. For example, the pattern or image can have a wood grain appearance. The extruded sheet can be sized for use as a vinyl siding product.

The invention will be more fully described by reference to the following drawings.

BRIEF DESCRIPTION OF THE DRAWINGS

For a better understanding of the present invention, reference may be made to the accompanying drawings.

DETAILED DESCRIPTION

Figure 1:
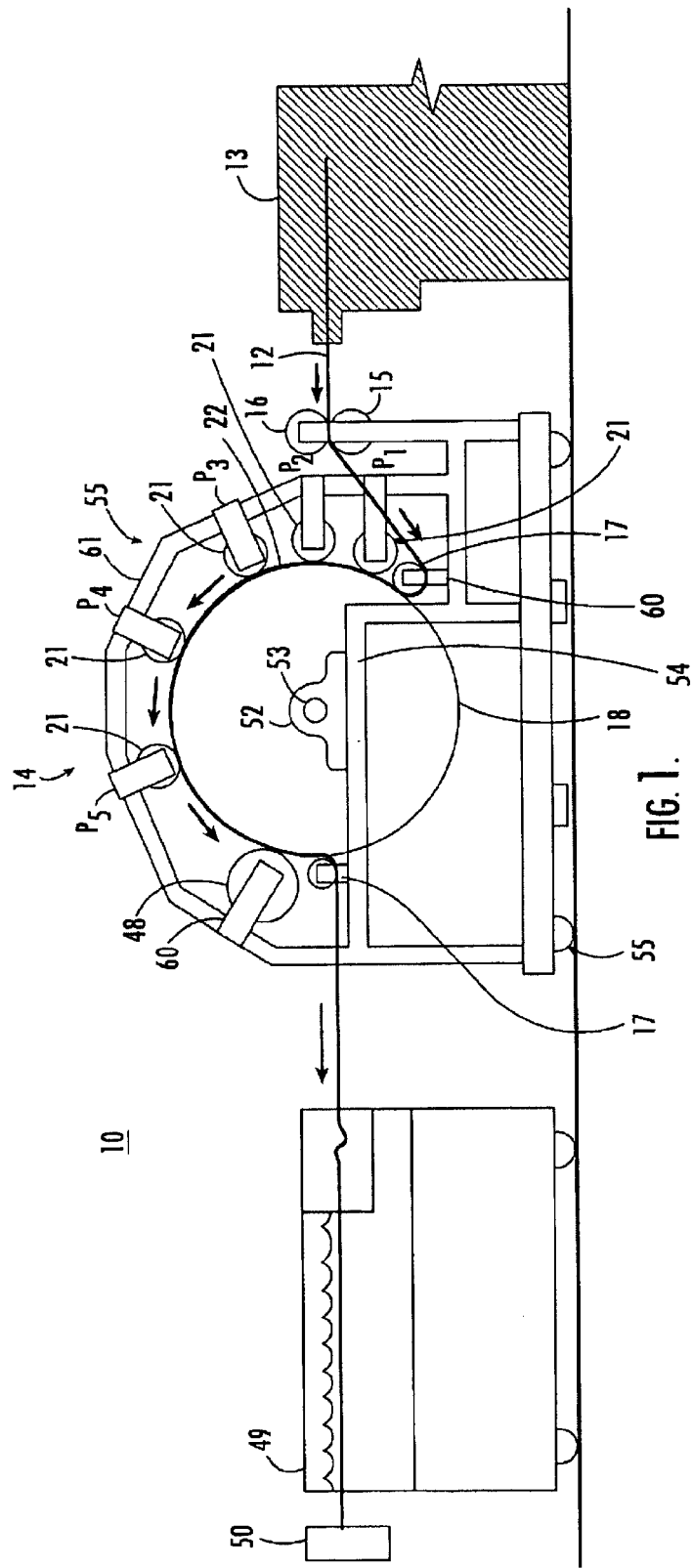
FIG. 1 is a side elevational view of a system for printing an extruded material.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a side elevational view of a system for printing on extruded material 10 in accordance with the teachings of the present invention. Extruded sheet 12 exits extruder 13. Extruder 13 can be any conventional extruder such as for example a Cincinnati Milicron.

Extruded sheet 12 can be formed of an extrudable plastic substrate material. For example, extruded sheet 12 can be formed of polyvinylchloride (PVC), polystyrene, acrylonitrile-butadiene-styrene (ABS), nylon, ethylene-vinyl acetate (EVA), polycarbonate, polyethylene, polypropylene, polyethylene terepthalate, thermoplastic olefins, acrylonitrile-styrene-acrylic (ASA), and alloys, blends or coextrusions of these resins. Extruded sheet 12 exits extruder 13 at an elevated temperature. For example, the elevated temperature can be in the range of about 250° F. to about 450° F. and preferably about 390° F.

Extruded sheet 12 enters printing apparatus 14. Extruded sheet 12 is contacted by first rotating roll 15 and second rotating roller 16 of printing apparatus 14. First rotating roller 15 is placed opposite second rotating roller 16 to form a nip there between. Extruded sheet 12 is flattened between first rotating roller 15 and second rotating roller 16.

Figure 2:
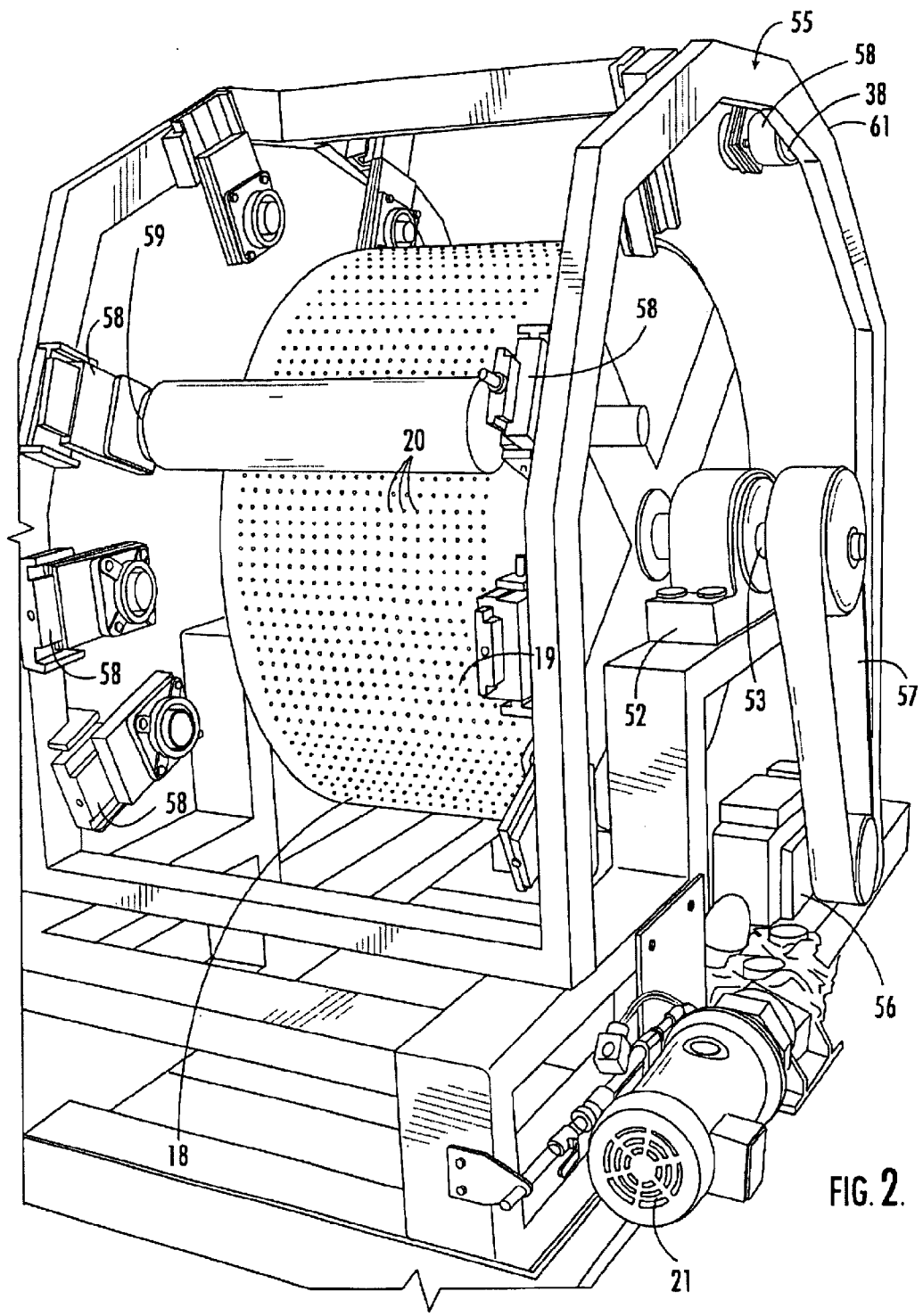
FIG. 2 is a front elevational view of a printing apparatus used in the system of the present invention.
Figure 3:
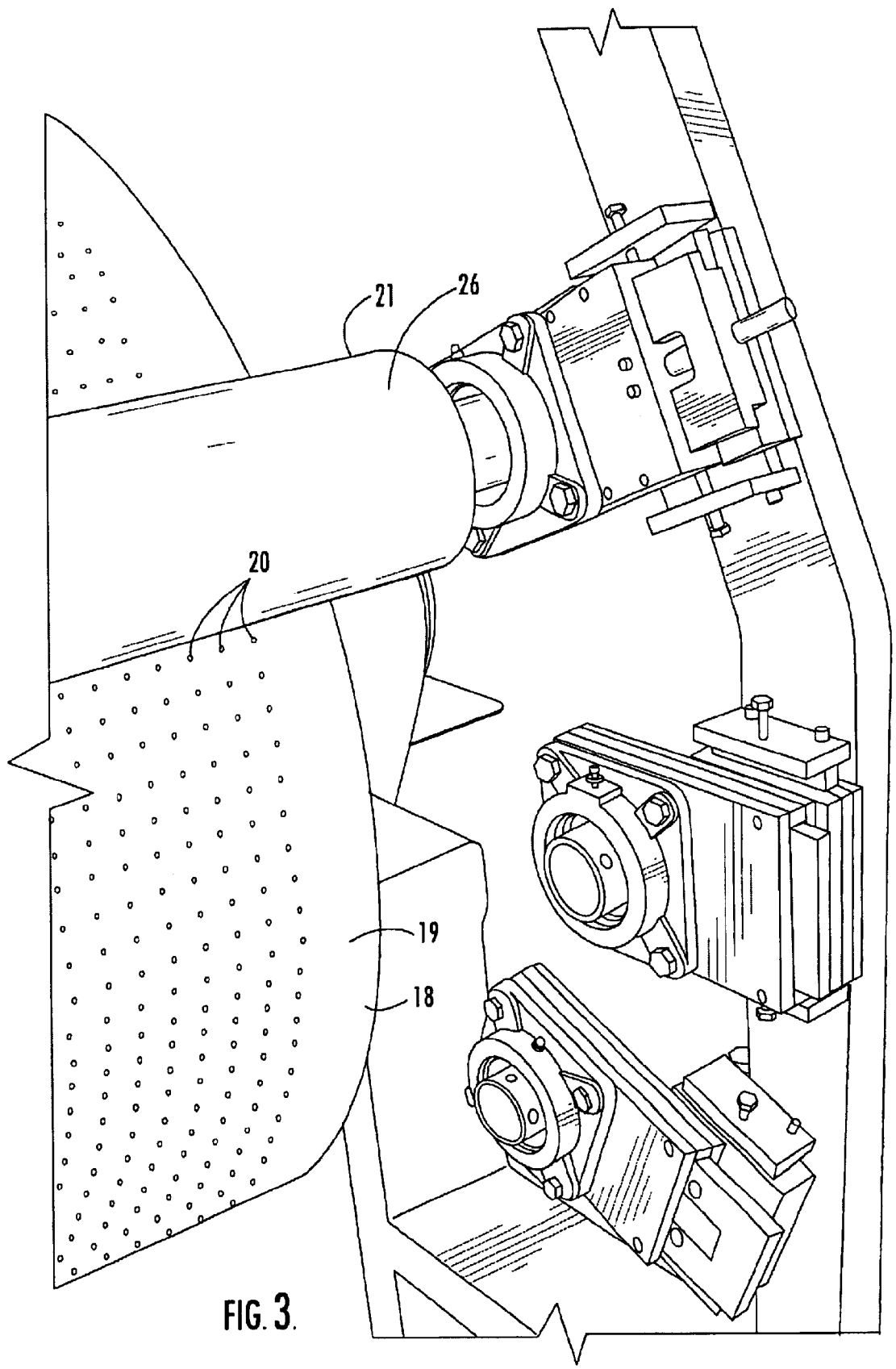
FIG. 3 is a schematic diagram of a print roller and application of ink to the print roller.

Positioning rollers 17 press extruded sheet 12 against drum 18. Preferably, surface 19 of drum 18 has a plurality of perforations 20, as shown in FIG. 2. Vacuum pump 21 pulls a sufficient vacuum to hold extruded sheet 12 against drum 18. Surface 19 of drum 18 is preferably formed of a flexible material to provide a flexible surface to allow extruded sheet 12 to lay flat against drum 18 during application of vacuum, as shown in FIG. 3. For example, surface 19 of drum 18 can be formed of natural rubber, silicon rubber or styrene-butadiene (SBR) rubber.

Print rollers 21 are positioned at predetermined positions $P_1$–$P_n$ adjacent drum 18 as shown in FIG. 1 and FIG. 3. Positions $P_1$–$P_n$ can be closely spaced. For example, positions $P_1$–$P_n$ can each be spaced about 18 inches to about 24 inches from one another. Each of print rollers 21 at respective positions $P_1$–$P_n$ can apply ink 22 of the same color or a different color to extruded sheet 12. Each of print rollers 21 can be selectively activated to print in order to formulate a combination of colors. In the embodiment, shown in FIG. 1, five print rollers 21 are used at respective positions $P_1$ to $P_5$. Print rollers 21 print the same color on extruded sheet 12 at position $P_1$ and $P_2$ to form a background color covering the entire extruded sheet 12. For example print rollers 21 at positions $P_1$ and $P_2$ can print any number of background colors such as colonial white, antique linen, desert tan, natural clay, country suede, light maple, sterling gray, granite gray, rustic cedar and ivy green. Alternatively, either print roller 21 at position $P_1$ or at position $P_2$ can be used to apply a color to extruded sheet 12. Print rollers 21 at one of respective positions $P_3$–$P_5$ can apply ink 22 to form a pattern on extruded sheet 12. For example, each of print rollers 21 at positions $P_3$–$P_5$ can apply ink to textured or patterned surface formed on the respective print roller 21 to print one of the primary colors: red, yellow or blue. A suitable print roller 21 is a gravure cylinder. The gravure cylinder can be engraved with a pattern or image. It will be appreciated that any conventional print roller could be used in accordance with the teachings of the present invention.

Extruded sheet 12 is held against drum 18 to provide precise registration between adjacent cylinders. For example, print rollers 21 at position $P_1$ can have a circumference of about 18 inches for printing about 18 inches on extruded sheet 12 and print roller 21 at position $P_2$ prints in registration adjacent to the area printed by print roller 21 at position $P_1$.

Ink 22 can be a heat cured ink. For example, ink 22 can be a plasticol ink which cures at a temperature in the range of about 140° F. to about 200° F. Accordingly, ink 22 cures immediately upon contact with extruded sheet 12 which has an elevated temperature. Alternatively, ink 22 can be an evaporable ink or any conventional ink which cures upon contact with a material having an elevated temperature.

Figure 4A:
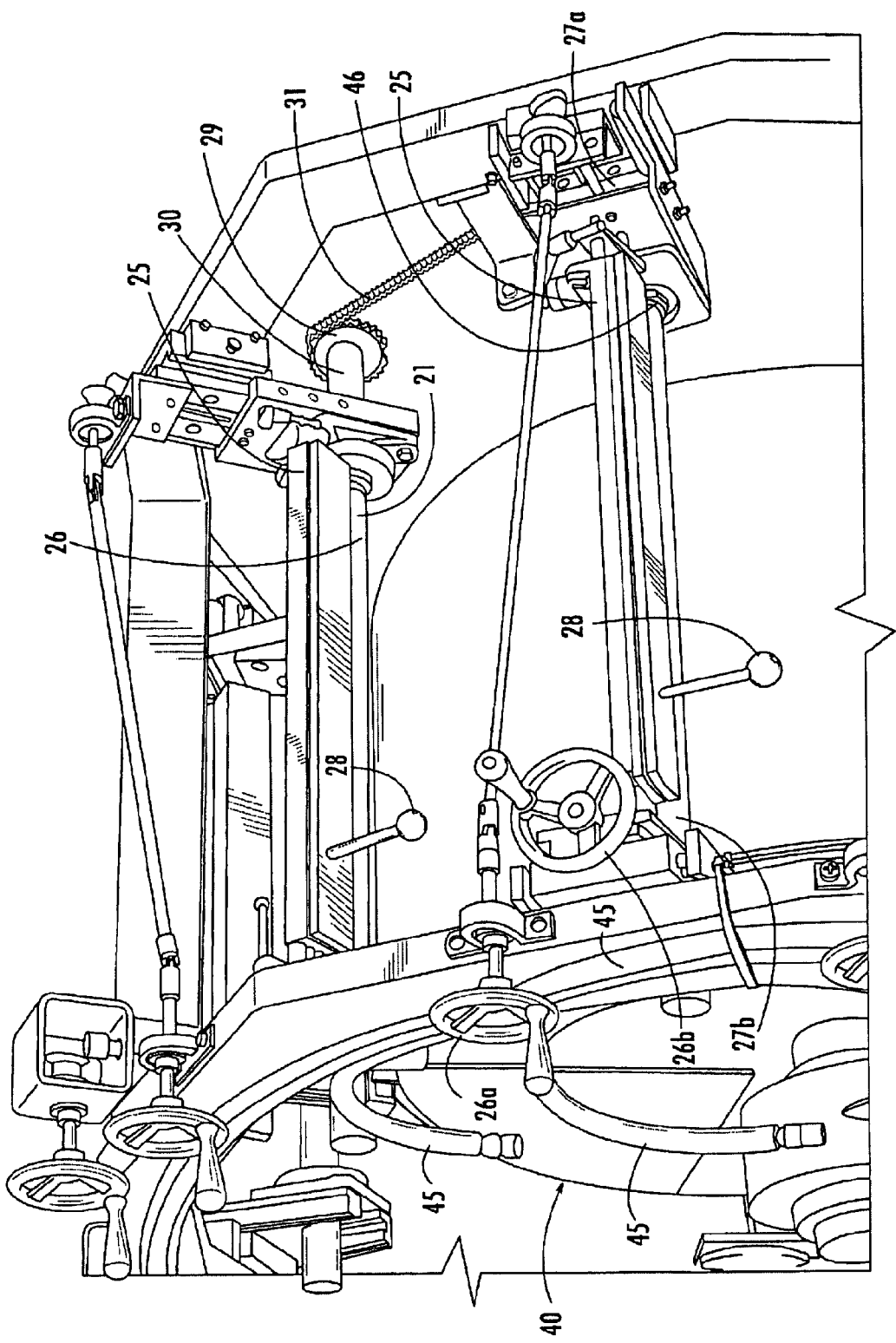
FIG. 4A is a front and top perspective view of a portion of the printing apparatus.
Figure 4B:
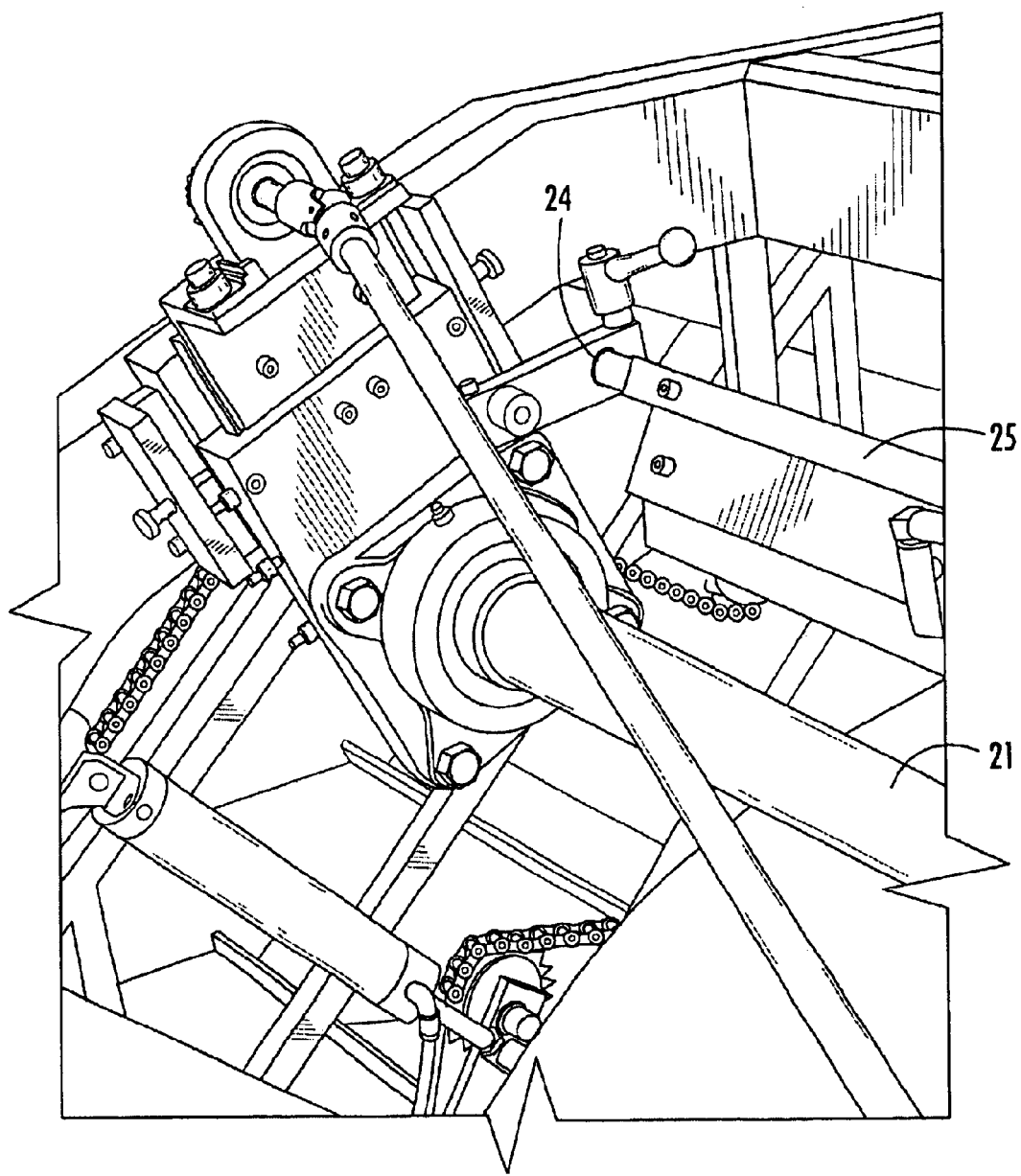
FIG. 4B is a top perspective view of a portion of the printing apparatus.

FIGS. 4A and 4B illustrate apparatus which can be used in system 10 for application of ink 22 to print roller 21. Pump 23 (not shown) pumps ink 22 to ink inlet 24. Ink inlet 24 dispenses ink 22 onto doctor blade 25. Pump 23 can be adjusted to supply the desired amount of ink 22 to doctor blade 25. Doctor blade 25 extends along the width of print roller 21. Doctor blade 25 spreads ink 22 over surface 26 of print roller 21. Excess ink 22 is removed by doctor blade 25.

Print rollers 21 can be lowered and raised adjacent drum 18 for respectively selective printing of ink 22 from respective print rollers 21 at positions $P_1$–$P_5$ to extruded sheet 12. In the embodiment shown in FIGS. 4A–4B, crank 26a is coupled to end 27a of print roller 21 and crank 26b is coupled to end 27b of print roller 21. Crank 26a and crank 26b can be selectively rotated for lowering and raising respective ends 27a and 27b respectively towards and away from drum 18. Doctor blade 25 can be lowered and raised respectively toward and away from drum 18 with handle 28. It will be appreciated that other apparatus can be used by one of ordinary skill in the art for raising and lowering print roller 21 and doctor blade 25 respectively.

All of print rollers 21 can be coupled to one another to provide simultaneous rotation of print rollers 21. Each of print rollers 21 can be coupled to toothed disc 29. Toothed discs 29 are attached by axle 30 to end 27a of print roller 21. Chain 31 is received on respective toothed discs 29 of each of print rollers 21. Chain 31 is coupled to a rotation motor (not shown) for rotation of chain 31 and simultaneously rotating respective print rollers 21.

Figure 5:
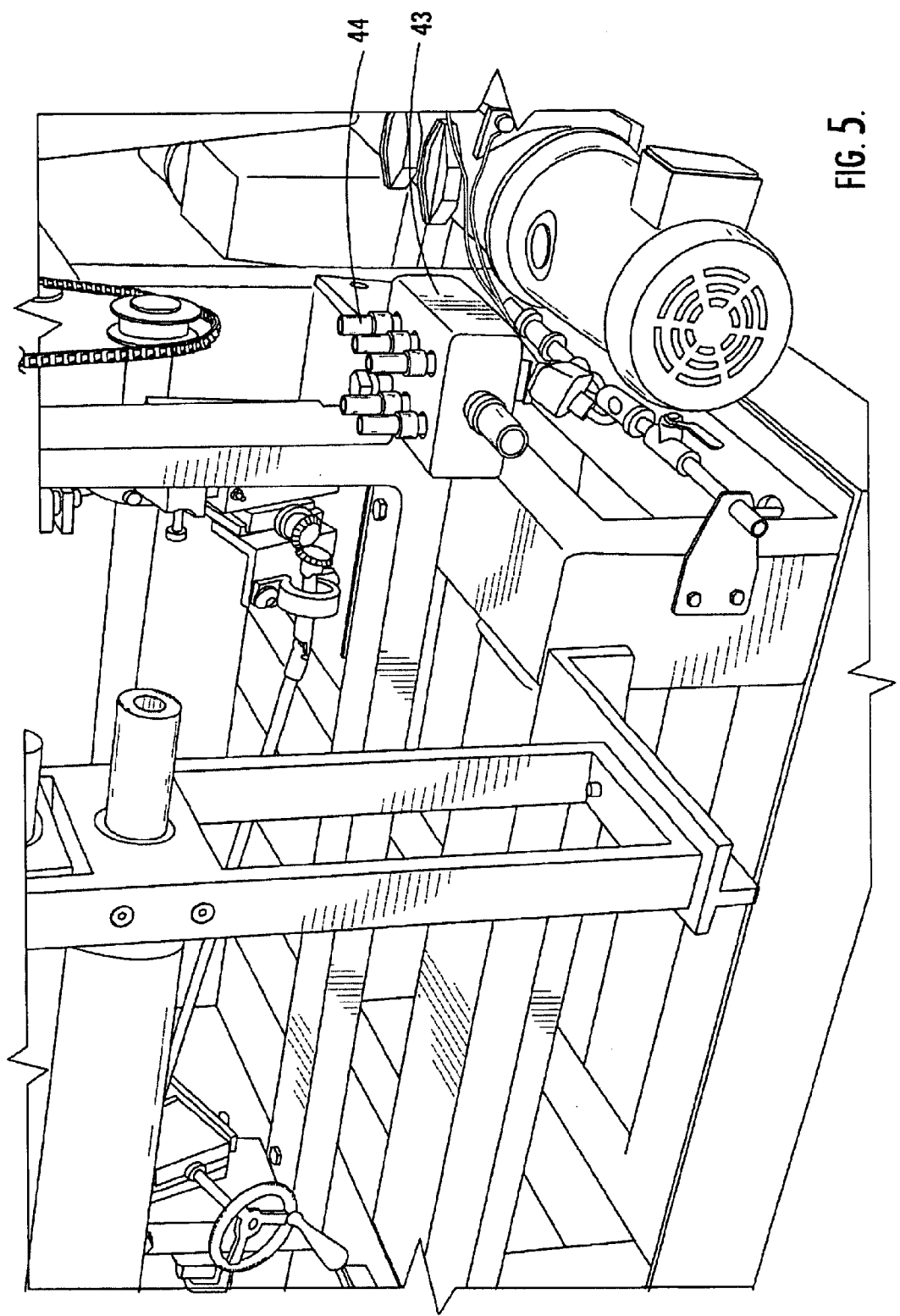
FIG. 5 is a perspective view of hose connection for a cooling apparatus used with the printing apparatus.

Print rollers 21 can be chilled with cooling apparatus 40 to prevent ink 22 from curing until contact with extruded sheet 12, as shown in FIG. 4A and FIG. 5. Cooling motor 42 can be attached with a hose (not shown) to inlet 41 to circulate a cooling liquid to manifold 43. Hose connections 44 are attached to manifold 43. A respective hose 45 can be attached to hose connections 44 and end 27b of each print roller 21. Upon attachment of hose 45, cooling liquid can circulate in aperture 46 within print roller 21 from end 27b of print roller 21 to end 27a of print roller 21. A suitable cooling liquid is water or glycol.

Extruded sheet 12 is received between embossing rollers 48 of printing apparatus 14 as shown in FIG. 1. Embossing rollers 48 can provide a desired texture to extruded sheet 12.

After printing with printing apparatus 14, extruded sheet 12 is drawn through cooling tank 49, as shown in FIG. 1. Cooling tank 49 is filled with a cooling liquid at a temperature in the range of about 40° F. to about 80° F. for cooling extruded sheet 12. Downstream of cooling tank 49 is a cutoff mechanism 50. Cutoff mechanism 50 cuts extruded sheet 12 to appropriate lengths. For example cutoff mechanism 50 can cut extruded sheet 12 into a predetermined length for forming a siding panel.

Figure 6:
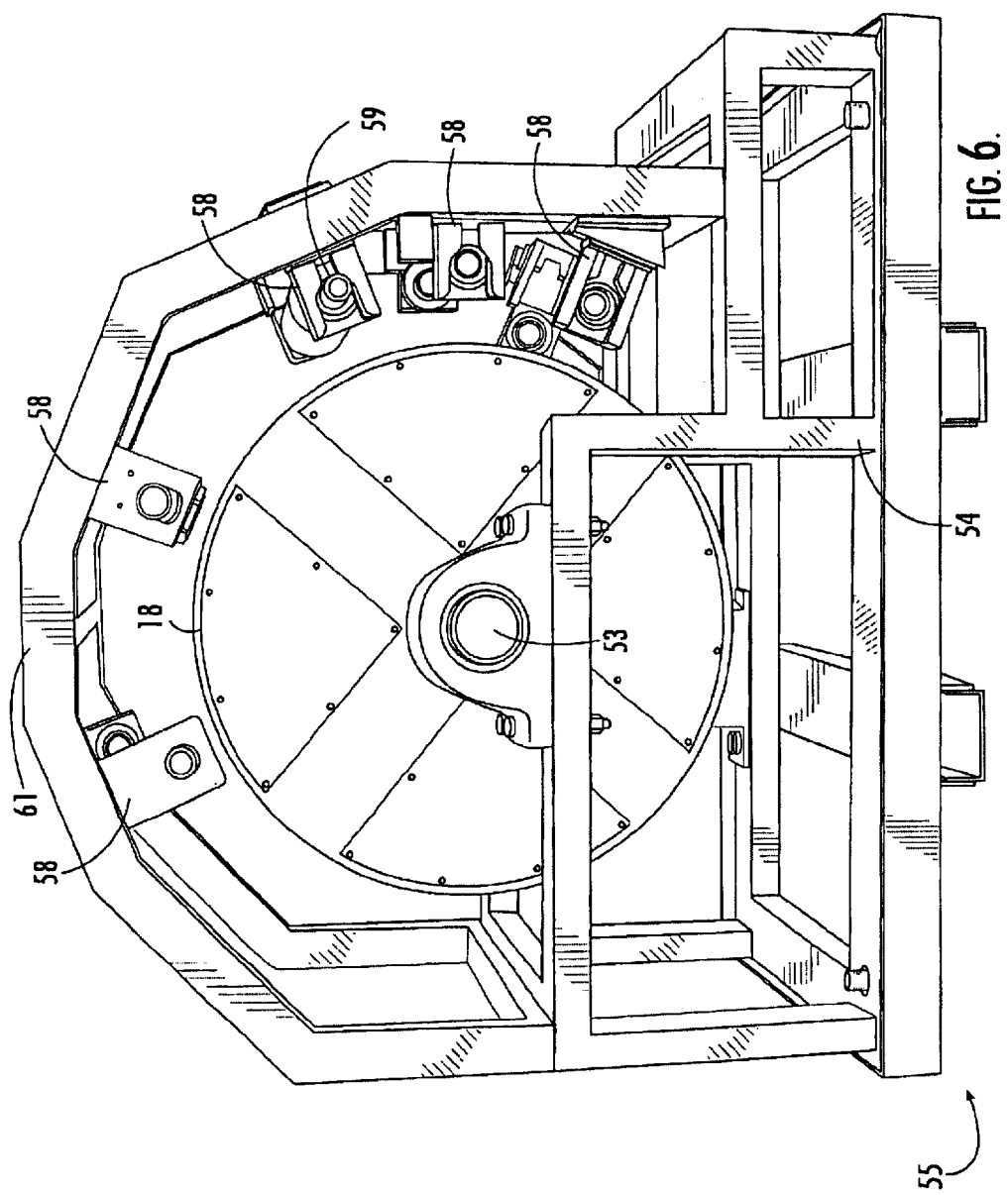
FIG. 6 is a side elevational view of the printing apparatus.

Mount 52 mounts protrusion 53 from each side of drum 18 to extension 54 of frame 55, as shown in FIGS. 1, 2 and FIG. 6. Mount 52 allows rotation of drum 18. Motor 56 is coupled by arm 57 to protrusion 53. Motor 56 rotates drum 18 in a clockwise direction. Mount 58 attaches each print roller 21 to frame 55. Print roller 21 is received on shaft 59 coupled to mount 58. Mounts 58 are coupled to upper portion 61 of frame 55. Positioning rollers 17 and embossing roller 48 are mounted by mounts 60 to upper portion 61 of frame 55, as shown in FIG. 1. Upper portion 61 of frame 55 is positioned above drum 18 and follows the shape of drum 18.

Figure 7A:
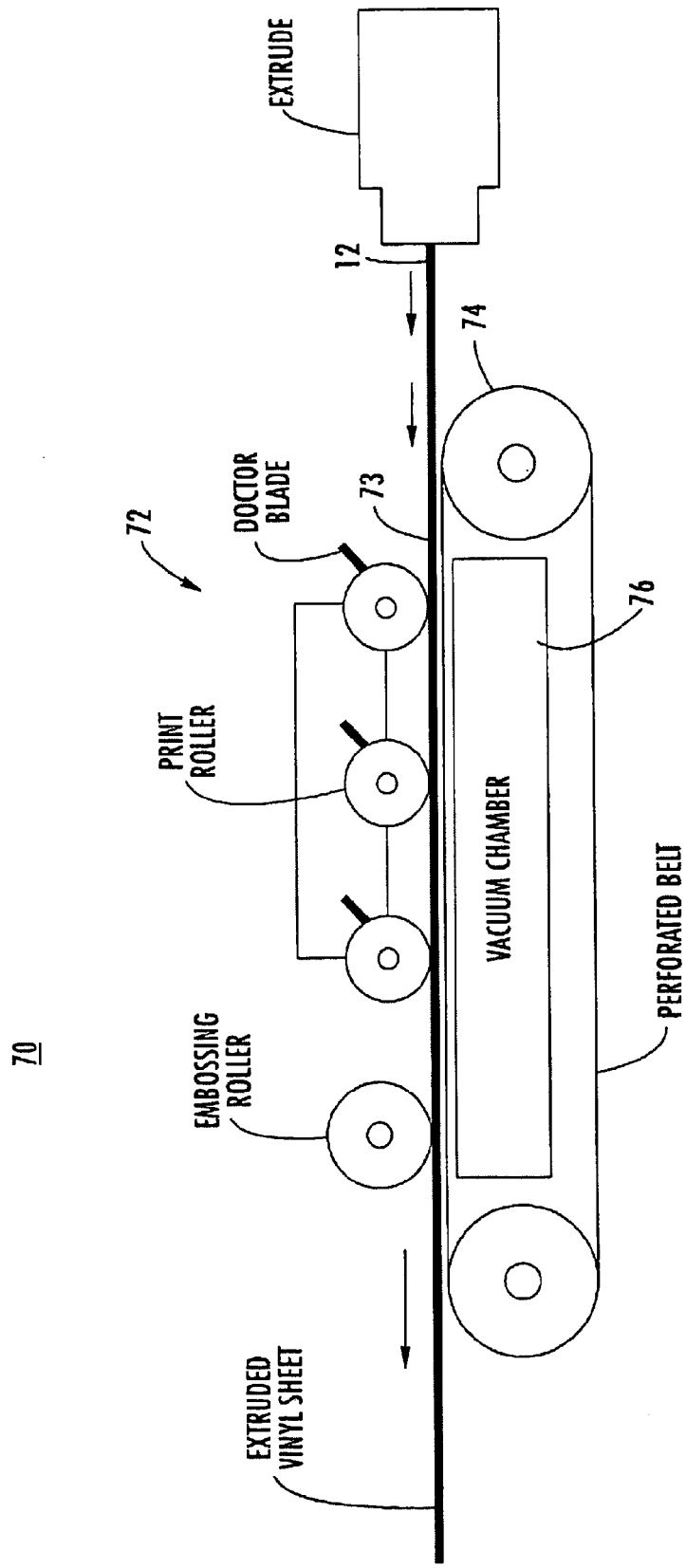
FIG. 7A is a schematic diagram of an alternative system for printing an extruded material.
Figure 7B:
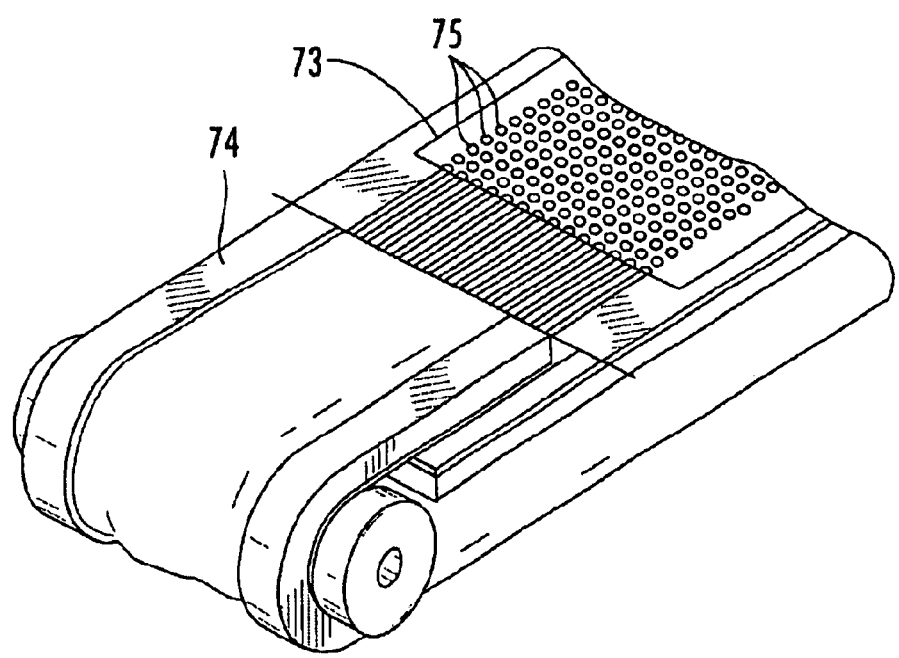
FIG. 7B is a schematic diagram of a belt used in the system of FIG. 7A.

FIGS. 7A and 7B illustrate an alternative system for printing an extruded material 70. Extruded sheet 12 enters printing apparatus 72. Extruded sheet 12 is received on surface 73 of rotatable belt 74. Belt 74 can be formed of a flexible material and can have a plurality of perforations 75 as shown in FIG. 7B. Vacuum chamber 76 pulls a sufficient vacuum to hold extruded sheet 12 against belt 74. Surface 73 of belt 74 is preferably formed of a flexible material to allow extruded sheet to lay flat against belt 74 during application of vacuum. Print rollers 12 $P_1$–$P_n$ are positioned adjacent belt 74. Print rollers $P_1$–$P_n$ operate as described above.

It is understood that the above-described embodiments are illustrative of only a few of the many possible specific embodiments which can represent applications of the principles of the invention. Numerous and varied other arrangements can be readily derived in accordance with these principles by those skilled in the art without departing from the spirit and scope of the invention.

What is claimed is:

1. A method for printing an extruded sheet comprising the steps of:

extruding an extruded sheet having an elevated temperature in the range of about 250° F. to about 450° F.; and applying heat curable ink over said extruded sheet having an elevated temperature with at least one print roller, wherein said heat curable ink cures immediately upon contact with said extruded sheet.

2. The method of claim 1 further comprising the steps of:
receiving said extruded sheet against a drum;
positioning said at least one print roller adjacent said extruded sheet; and
rotating said drum.

3. The method of claim 2 wherein said drum has a plurality of perforations in a surface thereof and further comprising the step of:
applying a vacuum to said drum to hold said extruded sheet against said drum.

4. The method of claim 3 wherein said step of receiving said extruded sheet comprises the step of:
positioning said extruded sheet against said drum with positioning rollers.

5. The method of claim 2 wherein said surface of said drum is formed of a flexible material.

6. The method of claim 1 further comprising the steps of:
receiving said extruded sheet against a rotatable belt;
positioning said at least one print roller adjacent said belt; and
rotating said belt.

7. The method of claim 6 wherein said belt has a plurality of perforations and further comprising the step of:
applying a vacuum to said belt to hold said extruded sheet against said belt.

8. The method of claim 7 wherein said belt is formed of a flexible material.

9. The method of claim 1 further comprising the step of embossing said extruded sheet after said step of applying said heat curable ink.

10. The method of claim 1 wherein a first print roller prints a background color on said extruded sheet and said second print roller prints a second color or a pattern of a second color on said extruded sheet, said first print roller and said second print roller are in registration with one another.

11. The method of claim 10 wherein said first print roller and said second print roller are simultaneously rotated.

12. The method of claim 1 wherein said print roller is a gravure cylinder.

13. The method of claim 1 wherein said extruded sheet is formed of polyvinylchloride (PVC), polystyrene, acrylonitrile-butadiene-styrene (ABS), nylon, ethylene-vinyl acetate (EVA), polycarbonate, polyethylene, polypropylene, polyethylene terepthalate, thermoplastic olefins, acrylonitrile-styrene-acrylic (ASA), and alloys, blends or coextrusions of these resins.

14. The method of claim 1 further comprising the step of:
cooling said at least one print roller during application of said heat curable ink to said print roller.

15. A system for printing an extruded sheet comprising:
means for receiving an extruded sheet having an elevated temperature in the range of about 250° F. to about 450° F.; and
means for applying heat curable ink over said extruded sheet with at least one print roller,
wherein said heat curable ink cures immediately upon contact with said extruded sheet.

16. The system of claim 15 further comprising:
means for receiving said extruded sheet against a drum;
means for positioning said at least one print roller adjacent said extruded sheet; and
means for rotating said drum.

17. The system of claim 16 wherein said drum has a plurality of perforations in a surface thereof and further comprising:
means for applying a vacuum to said drum to hold said extruded sheet against said drum.

18. The system of claim 17 wherein said surface of said drum is formed of a flexible material.

19. The system of claim 18 wherein said means for receiving said extruded sheet against said drum includes positioning rollers.

20. The system of claim 15 further comprising:
means for receiving said extruded sheet against a rotatable belt;
means for positioning said at least one print roller adjacent said extruded sheet; and
means for rotating said belt.

21. The system of claim 20 wherein said belt has a plurality of perforations and further comprising:
means for applying a vacuum to said belt to hold said extruded sheet against said belt.

22. The system of claim 21 wherein said belt is formed of a flexible material.

23. The system of claim 15 wherein a first print roller prints a background color on said extruded sheet and said second print roller prints a second color or a pattern of a second color on said extruded sheet.

24. The system of claim 15 wherein said print roller is a gravure cylinder.

25. The system of claim 15 wherein said extruded sheet is formed of polyvinylchloride (PVC), polystyrene, acrylonitrile-butadiene-styrene (ABS), nylon, ethylene-vinyl acetate (EVA), polycarbonate, polyethylene, polypropylene, polyethylene terepthalate, thermoplastic olefins, acrylonitrile-styrene-acrylic (ASA), and alloys, blends or coextrusions of these resins.

26. The system of claim 15 comprising:
a plurality of said print rollers; and
means for simultaneously rotating said plurality of print rollers.

27. The system of claim 26 further comprising:
means for selectively lowering and raising said print rollers.

28. The system of claim 15 wherein said means for applying ink comprises a doctor blade positioned adjacent a respective said at least one print roller, said doctor blade applying said ink to said print roller.

29. The system of claim 28 further comprising:
means for lowering and raising said doctor blade towards and away from said print roller.

30. The system of claim 15 further comprising:
means for cooling said at least one print roller during application of said heat curable ink to said print roller.

31. A printing apparatus comprising:
a rotating drum having a plurality of perforations on the surface thereof for receiving an extruded sheet against said drum;
said extruded sheet having an elevated temperature in the range of about 250° F. to about 450° F.;
means for applying a vacuum to said rotating drum to retain said extruded sheet against said drum; and
at least one print roller positioned adjacent said drum for applying heat curable ink over said extruded sheet,
wherein said ink cures immediately upon contact with said extruded sheet.

32. The printing apparatus of claim 31 wherein a first print roller prints a background color on said extruded sheet and said second print roller prints a second color or a pattern of a second color on said extruded sheet, said first print roller and said second print roller being in registration with one another.

33. The printing apparatus of claim 32 wherein a third print roller prints a third color or a pattern of a third color on said extruded sheet.

34. The printing apparatus of claim 33 wherein a fourth print roller prints a fourth color or a pattern of a fourth color on said extruded sheet.

35. The printing apparatus of claim 34 wherein a fifth print roller prints a fifth color or a pattern of a fifth color on said extruded sheet.

36. A printing apparatus comprising:
- a rotating belt having a plurality of perforations for receiving an extruded sheet against said belt;
- said extruded sheet having an elevated temperature in the range of about 250° F. to about 450° F.;
- means for applying a vacuum to said rotating belt to retain said extruded sheet against said belt; and
- at least one print roller positioned adjacent said belt for applying heat curable ink over said extruded sheet,
- wherein said ink cures immediately upon contact with said extruded sheet.

37. The printing apparatus of claim 36 wherein a first print roller prints a background color on said extruded sheet and said second print roller prints a second color or a pattern of a second color on said extruded sheet, said first print roller and said second print roller being in registration with one another.

38. A method for printing an extruded sheet comprising the steps of:
- extruding an extruded sheet having an elevated temperature in the range of about 250° F. to about 450° F.; and
- applying an evaporable ink over said extruded sheet having an elevated temperature with at least one print roller,
- wherein said evaporable ink cures immediately upon contact with said extruded sheet.

39. A system for printing an extruded sheet comprising:
- means for receiving an extruded sheet having an elevated temperature in the range of about 250° F. to about 450° F.; and
- means for applying evaporable ink over said extruded sheet with at least one print roller,
- wherein said evaporable ink cures immediately upon contact with said extruded sheet.

* * * * *